United States Patent [19]
Nogami

[11] Patent Number: 5,814,732
[45] Date of Patent: Sep. 29, 1998

[54] LASER DOPPLER SPEED MEASURING APPARATUS

[75] Inventor: Asahiko Nogami, Tokyo, Japan

[73] Assignee: Sony Magnescale Inc., Tokyo, Japan

[21] Appl. No.: 708,319

[22] Filed: Sep. 5, 1996

[30] Foreign Application Priority Data

Sep. 6, 1995 [JP] Japan ..................... 7-229224

[51] Int. Cl.$^6$ ................................. G01N 21/41
[52] U.S. Cl. .......................... 73/657; 356/28.5
[58] Field of Search ............ 73/657, 488; 356/28, 356/28.5, 5.05, 5.09; 250/227.23

[56] References Cited

U.S. PATENT DOCUMENTS

| | | | |
|---|---|---|---|
| 4,281,245 | 7/1981 | Brogardh | 250/227.23 |
| 4,666,295 | 5/1987 | Duvall, III et al. | 365/5 |
| 5,534,992 | 7/1996 | Takeshima | 356/5.09 |

FOREIGN PATENT DOCUMENTS

| | | |
|---|---|---|
| 0 272 726 A1 | 6/1988 | European Pat. Off. . |
| 0 283 299 A2 | 9/1988 | European Pat. Off. . |
| 2 173 064 | 10/1986 | United Kingdom . |

*Primary Examiner*—Christine K. Oda
*Attorney, Agent, or Firm*—Foley & Lardner

[57] ABSTRACT

A laser Doppler speed measuring apparatus comprises a laser light source, a photodetector, an FM demodulator, and an integrated filter circuit. A selector switch is interposed between the FM demodulator and the integrated filter circuit so as to ensure switching between an output of the FM demodulator and a terminal for directly receiving an external signal.

9 Claims, 3 Drawing Sheets

LASER DOPPLER SPEED MEASURING APPARATUS

BACKGROUND OF THE INVENTION

The present invention relates generally to a laser Doppler speed measuring apparatus and more particularly, to an apparatus for measuring a speed of a vibrating object by projecting a laser beam thereto, and performing FM demodulation of light reflected thereby and thus frequency-modulated.

A brief description will be made with regard to the principle of the laser Doppler speed measuring apparatus. A laser beam emitted from a laser light source is divided into two beams by a first beam splitter, one of them serving as reference light and being incident on a second beam splitter via a first reflecting mirror, an optical modulator, and a second reflecting mirror.

On the other hand, another of the two beams is incident on an object to be measured via the second beam splitter, and a beam reflected thereby is incident again on the first beam splitter. In the first beam splitter, reflected light from the object interferes with reference light to produce interference light which is detected by a photodetector.

When the object to be measured vibrates, reflected light therefrom has a frequency modulated in accordance with vibration, so that FM demodulation of reflected light enables detection of the vibration speed of the object. It is noted that the moving speed of the measured can also be detected.

Next, a brief description will be made with regard to a conventional laser Doppler speed measuring apparatus. The speed measuring apparatus comprises a probe including the above optical unit, i.e., a transmitter/receiver of a laser beam including a laser light source, an optical modulator, an interference unit, etc. An output of the probe is supplied to an FM demodulator wherein reflected light from an object to be measured is subjected to FM demodulation to obtain speed information on the object, which is output to an output terminal via an integrated filter circuit.

The conventional laser Doppler speed measuring apparatus has a problem of phase lag in the high range of its output, which is caused mostly by a low pass-filter arranged downstream of the FM demodulator, and sometimes by a high-pass filter, a differentiation circuit, an integration circuit, etc.

The laser Doppler speed measuring apparatus is functional according to the pulse count method, quadrature, or phase locked loop (PLL) method. Due to its use of the FM demodulator, a low-pass filter is indispensable for elimination of a carrier. Moreover, low-pass filters for some cutoff frequencies are provided to ensure elimination of triangular noise proper to frequency modulation.

As for the low-pass filters, the phase begins to lag from a quite early point even in the range with a frequency below the cutoff frequency, and an amplitude flat. By way of example, a transfer function $G(j\omega)$ of a first-order low-pass filter comprising a simple capacitor resistor (CR) is given by:

$$G(j\omega)=(1/CR)/(j\omega+(1/CR))$$

An absolute value $|G|$ of the amplitude and a phase argG are given respectively by:

$$|G|=(1/(1+(\omega CR)^2)^n, \text{ wherein } n=\frac{1}{2}$$

$$\text{argG}=-\text{arch. tan }(\omega CR)$$

At the cutoff frequency ($fc=\frac{1}{2} \pi CR$), the absolute value $|G|$ of the amplitude is $\frac{1}{2}^{1/2}$ (=0.0707...), whereas the phase argG lags by 45°. Actually, the low-pass filter is in the form of an 8-order butterworth low-pass filter wherein, at the cutoff frequency, the absolute value $|G|$ of the amplitude is practically zero decibel, whereas the phase argG lags by 360°.

In such a way, the laser Doppler speed measuring apparatus has its own phase lag which is added, even in a guaranteed output amplitude range, to a phase characteristic of an object to be measured, resulting in a possible erroneous measurement.

Conventionally, however, due to lack of maker's detailed explanation for the above inconvenience in catalogues and specifications, most of the users judged that the performance of their laser Doppler speed measuring apparatus is satisfactory to enable a correct amplitude/phase vector measurement in the guaranteed output amplitude range, obtaining incorrect measurement results.

Some of the users who were aware of the above inconvenience adopted several measuring methods which enable cancelling of the phase lag of their laser Doppler speed measuring apparatus. The simplest method is to carry out conversion of the measurement results by using maker-offered data on amplitude/phase frequency characteristics of the low-pass filters, the high-pass filters, etc., in the laser Doppler speed measuring apparatus.

However, this method requires much effort when carried out manually. Moreover, even with a computer, this method is unsatisfactory since the resolution upon measurement is not always constant, and all of the users do not necessarily input the measurement results of a servo analyzer, a lock-in amplifier, an oscilloscope, etc. in their computers through an analog-to-digital (AD) converter, a Hewlett-Packard interface bus (HPIB), etc.

Another method is as follows. A unit is prepared comprising a servo analyzer, a reference vibration source, an object to be measured, and a laser Doppler speed measuring apparatus including a probe, an FM demodulator and an integrated filter circuit. First, an excitation or sweep signal output from an output terminal of the servo analyzer is provided to the reference vibration source to measure the speed of vibration produced by the reference vibration source through the laser Doppler speed measuring apparatus, which is input to a second input terminal of the servo analyzer.

The excitation signal output from the output terminal of the servo analyzer is also provided to a first input terminal thereof. In accordance with the signals input to the first and second input terminals, the servo analyzer carries out vector analysis for measuring an amplitude/phase difference between the excitation signal and the measured signal so as to determine an amplitude/phase frequency characteristic of an output signal with respect to the excitation signal output from the output terminal, which is stored therein as a reference value.

Next, the excitation signal output from the output terminal of the servo analyzer is provided to the object to be measured. It is noted that, at that time, an output of the output terminal is also supplied to the first input terminal. The object is vibrated by the excitation signal. The speed of this vibration is measured by the laser Doppler speed measuring apparatus, which is input to the second input terminal of the servo analyzer.

The servo analyzer carries out, according to the vector analysis method, amplitude/phase vector measurement of the excitation signal input from the first input terminal and the measured signal indicative of the vibration speed input from the second input terminal, which is compared with the reference value, obtaining a correct measured value.

However, this method is available only when the performance of the reference vibration source exceeds that of the laser Doppler speed measuring apparatus. Therefore, in view of a recent improvement of the performance of the laser Doppler speed measuring apparatus, this method is merely effective for a relative evaluation of the speed between the reference vibration source and the object to be measured.

The other method is as follows. This method is substantially the same as the above another method except the use of an FM modulator in place of the reference vibration source is as follows.

An output of the servo analyzer is provided to the first input terminal thereof, and to the FM modulator to obtain a frequency-modulated signal which is supplied to the FM demodulator. An FM-demodulated signal is input to the second input terminal of the servo analyzer via the integrated filter circuit.

The servo analyzer carries out, according to the vector analysis method, vector analysis of the signals input to the first and second input terminals to determine an input/output amplitude/phase frequency characteristic of the integrated filter circuit after FM demodulation, which is stored therein as a reference value. In this case, suppose that the FM modulator and the FM demodulator hardly affect the above frequency characteristic. Practically, the use of the FM modulator and laser Doppler speed measuring apparatus with high performance can prevent a harmful influence on the above frequency characteristic.

Subsequently, in the same way as in the above another method, a signal out of the servo analyzer is provided to the object to be measured so as to detect vibration or speed thereof through projection of a laser beam, which is received by the probe, and supplied to the second input terminal of the servo analyzer via the FM demodulator and the integrated filter circuit. In accordance with the two inputs, the servo analyzer carries out amplitude/phase vector calculation, which is compared with the reference value, outputting a correct amplitude/phase vector value.

This method is better than the two precedent method, but requires an FM demodulator with high performance and high cost.

It is, therefore, an object of the present invention to provide a laser Doppler speed measuring apparatus which is free from the above drawbacks, and enables highly reliable measurement with simple construction.

SUMMARY OF THE INVENTION

According to one aspect of the present invention, there is provided an apparatus for measuring a speed of an object, comprising:
a source of a laser beam, said laser beam having a reference beam and a beam incident on the object;
a photodetector arranged to detect a composite light of said reference beam and a beam reflected by the object and generate a signal indicative of said composite light detected;
an FM demodulator connected to said photodetector, said FM demodulator serving to FM-demodulate said signal;
filter circuit means for filtering said signal as FM-demodulated; and
a selector switch interposed between said FM demodulator and said filter circuit means, said selector switch ensuring switching between an output of said FM demodulator and a terminal for directly receiving an external signal.

Another aspect of the present invention lies in providing an apparatus for measuring a speed of an object, comprising:
means for producing a laser beam, said laser beam having a reference beam and a beam incident on the object;
means for detecting a composite light of said reference beam and a beam reflected by the object and generating a signal indicative of said composite light detected;
means, connected to said detecting means, for FM-demodulating said signal;
means for filtering said signal as FM-demodulated; and
means, interposed between said FM-demodulating means and said filtering means, for ensuring switching between an output of said FM-demodulating means and a terminal for directly receiving an external signal.

DETAILED DESCRIPTION OF THE INVENTION

Figure 1:
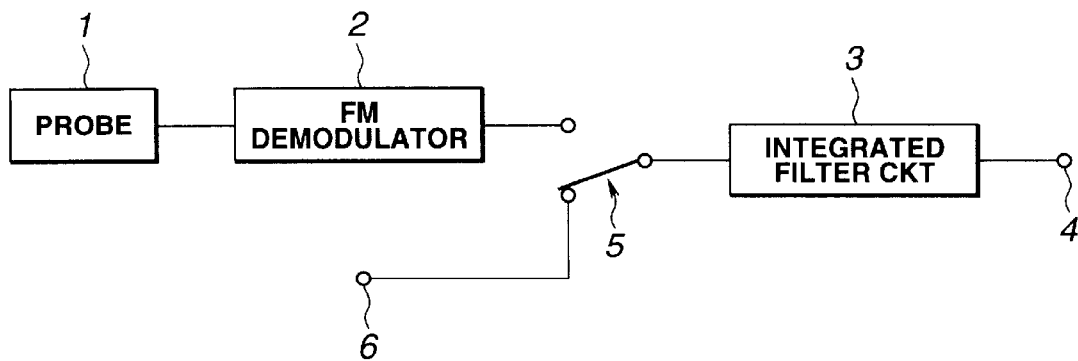
FIG. 1 is a block diagram showing a first preferred embodiment of a laser Doppler speed measuring apparatus according to the present invention.

Referring first to FIG. 1, a laser Doppler speed measuring apparatus comprises a probe 1, an FM demodulator 2, an integrated filter circuit 3, an output terminal 4, a selector switch 5, and an input terminal 6.

The probe 1 includes a source of a laser beam projected to an object to be measured, an optical modulator with respect to reference light, an interference unit for making laser light reflected by the object and thus frequency-modulated interfere with reference light to obtain interference light, a photoelectric transducer for converting an optical signal of interference light into an electric signal, etc.

The FM demodulator 2 is arranged to demodulate a signal modulated by the speed of movement or vibration of the object to obtain speed information. The integrated filter circuit 3 is arranged to obtain a desired frequency band signal out of frequency components which appear at an output of the FM demodulator 2. The integrated filter circuit 3 can include a filter for eliminating a carrier frequency component which appears at an output of the FM demodulator 2.

The selector switch 5 is arranged to carry out switching of an input to the integrated filter circuit 3 between an output of the FM demodulator 2 and an input of the input terminal 6. The input terminal 6 serves to directly input an external signal to the integrated filter circuit 3.

Figure 2:
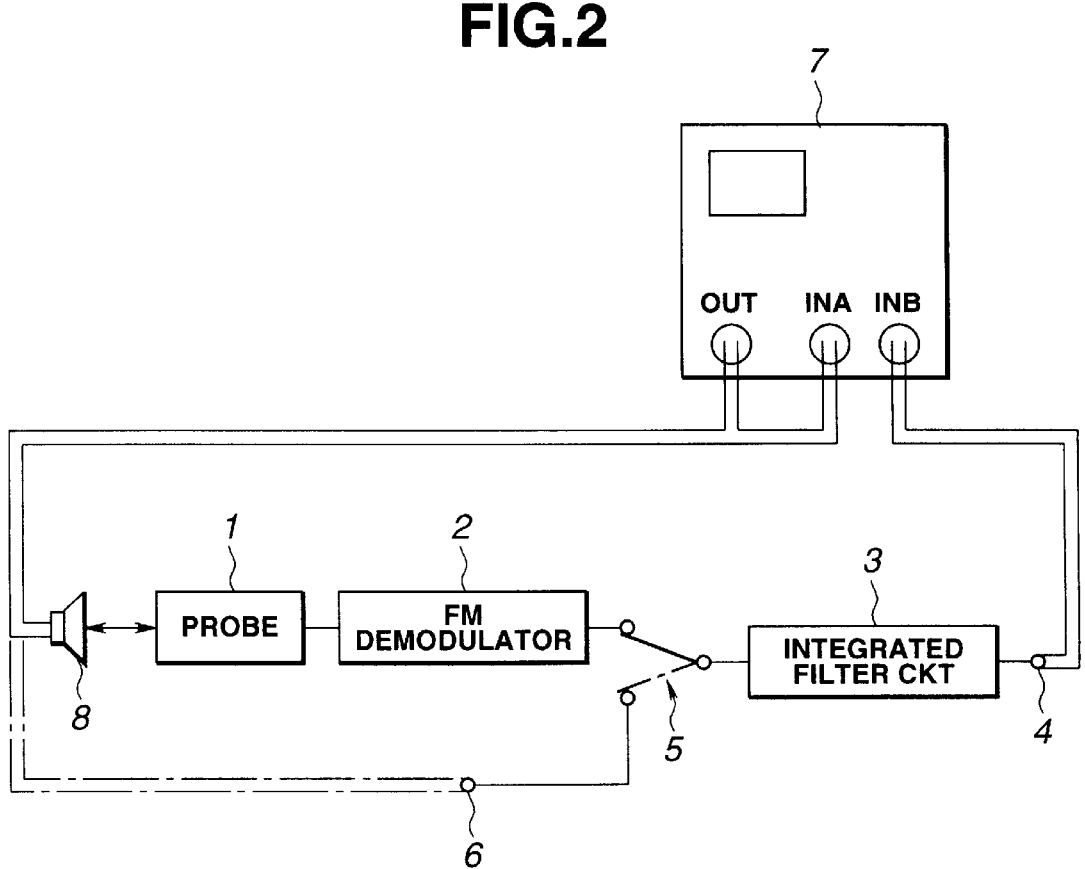
FIG. 2 is a view similar to FIG. 1, showing the laser Doppler speed measuring apparatus connected to a servo analyzer.

Referring next to FIG. 2, measurement carried out by the laser Doppler speed measuring apparatus as shown in FIG. 1 will be described. First, circuit connection is made such that an excitation signal output from a servo analyzer 7 is provided to an object to be measured, and also to a first input terminal INA of the servo analyzer 7.

The laser Doppler speed measuring apparatus is placed near the object 8, and is connected to the servo analyzer 7 to directly receive an output thereof at the input terminal 6. The output terminal 4 of the laser Doppler speed measuring apparatus is connected to a second input terminal INB of the servo analyzer 7. Upon measuring, the selector switch 5 is switched on the side of the input terminal 6 to directly supply an excitation or sweep signal supplied from an output terminal OUT of the servo analyzer 7 to the integrated filter circuit 3. An output of the integrated filter circuit 3 is supplied to the second input terminal INB of the servo analyzer 7 wherein an input/output amplitude/phase frequency characteristic of the integrated filter circuit 3 is determined in accordance with the transmitted excitation signal and the received output of the integrated filter circuit 3, which is stored therein as a reference value.

Next, the selector switch 5 is switched to connect an output of the FM demodulator 2 to an input of the integrated filter circuit 3. At that time, since an excitation signal output from the servo analyzer 7 is provided to the object 8, the object 8 is being vibrated. In the laser Doppler speed measuring apparatus, the probe 1 projects a laser beam to the object 8, and receives reflected light modulated in accordance with the speed of vibration of the object 8, which is converted into an electric signal, and provided to the FM demodulator 2.

A speed information signal of the object 8 as FM-demodulated is filtered in the integrated filter circuit 3, which is supplied to the second input terminal INB of the servo analyzer 7. The servo analyzer 7 carries out vector analysis of the speed information signal, which is compared with the reference value, obtaining a correct amplitude/phase vector value.

Figure 3:
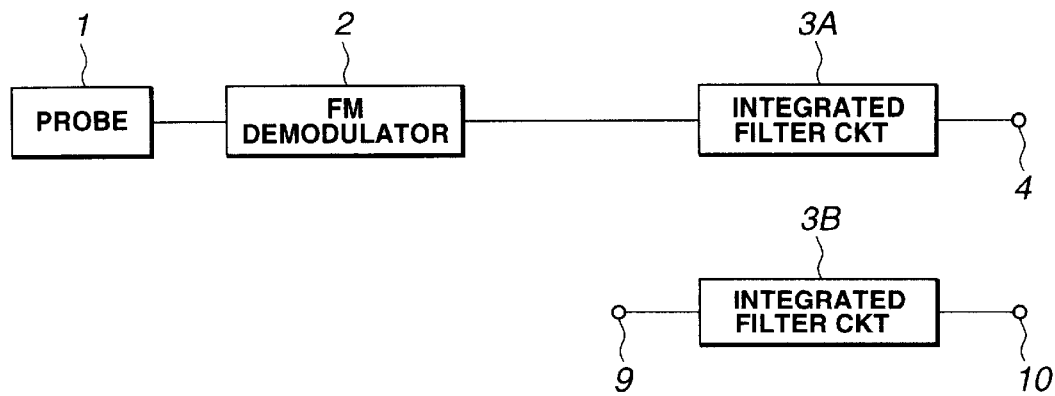
FIG. 3 is a view similar to FIG. 2, showing a second preferred embodiment of the present invention.
Figure 4:
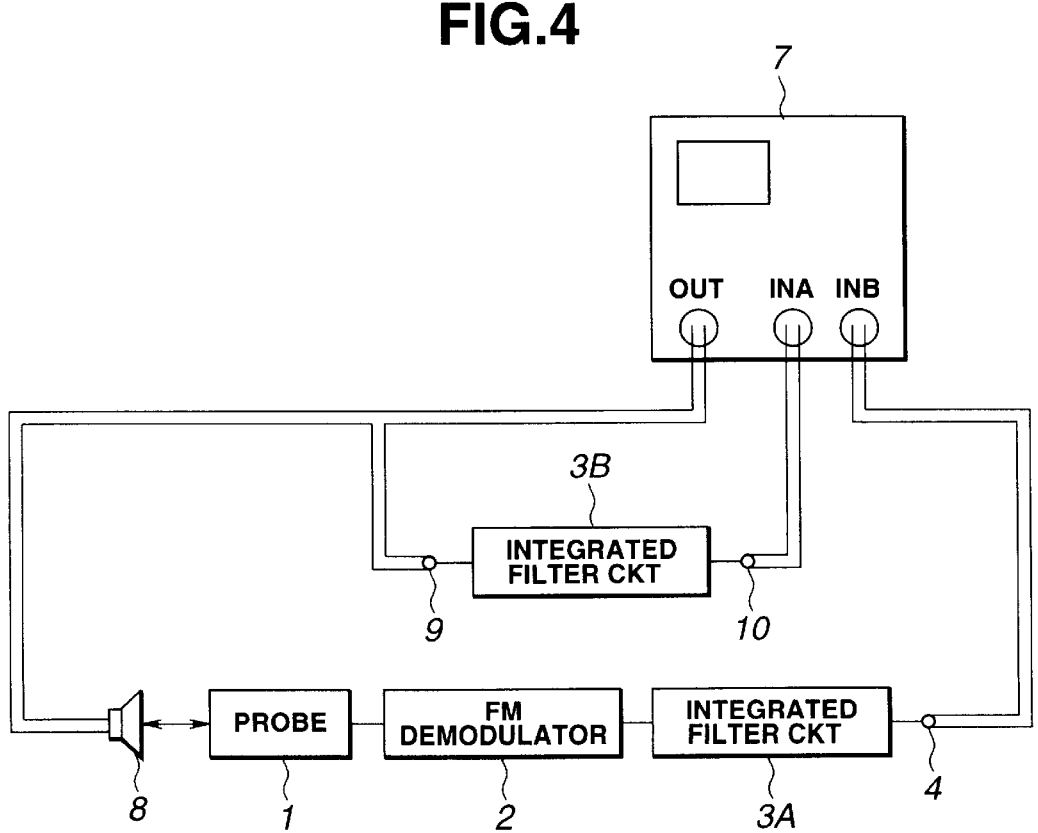
FIG. 4 is a view similar to FIG. 3, showing the laser Doppler speed measuring apparatus in FIG. 3 connected to the servo analyzer.

Referring to FIGS. 3 and 4, a second embodiment of a laser Doppler speed measuring apparatus will be described. The second embodiment is substantially the same as the first embodiment except arrangement of two integrated filter circuits. The first integrated filter circuit 3A serves to filter an output of the FM demodulator 2 in the same way as in the first embodiment.

On the other hand, the second integrated filter circuit 3B is a filter circuit of reference, and has the same input/output amplitude/phase frequency characteristic as that of the first integrated filter circuit 3A. The second integrated filter circuit 3B is arranged independently of a loop for the above measurement, and has its own input and output terminals 9, 10.

Referring to FIG. 4 measurement carried out by the laser Doppler speed measuring apparatus as shown in 3 will be described. Prior to measurement, circuit connection is made such that the output terminal OUT of the servo analyzer 7 is connected to the input terminal 9 of the second integrated filter circuit 3B, and the output terminal 10 of the second integrated filter circuit 3B is connected to the first input terminal INA of the servo analyzer 7.

The output terminal OUT of the servo analyzer 7 is also connected to the object 8. The object 8 is appropriately placed with respect to the probe 1 so that the probe 1 projects a laser beam to the object 8, and can receive light reflected thereby. It is thus possible to consider that the object 8 and the probe 1 is optically connected to each other.

Moreover, circuit connection is made so that an output of the probe 1 is supplied to the FM demodulator 2, then to the first integrated filter circuit 3A, which is supplied to the second input terminal INB of the servo analyzer 7.

In such a state, an excitation or sweep signal output from the output terminal OUT of the servo analyzer 7 is provided to the object 8, and also to the second integrated filter circuit 3B. After passing through the second integrated filter circuit 3B, the excitation signal is supplied to the first input terminal INA of the servo analyzer 7.

On the other hand, a speed information signal of the object 8 output from the probe 1 is demodulated in the FM demodulator 2. An output of the FM demodulator 2 is provided to the first integrated filter circuit 3A to eliminate therefrom needless frequency components, which is supplied to the second input terminal INB of the servo analyzer 7.

The servo analyzer 7 carries out, according to the vector analysis method, vector analysis of amplitude/phase frequency characteristics of the two input signals, i.e. the excitation signal provided via the second integrated filter circuit 3B and the signal provided from an output of the laser Doppler speed measuring apparatus. In this case, an influence of the first integrated filter circuit 3A constituting the laser Doppler speed measuring apparatus is canceled by that of the second integrated filter circuit 3B serving as a reference, enabling correct amplitude/phase vector measurement.

Generally, the integrated filter circuit constituting the laser Doppler speed measuring apparatus comprises a low-pass filter, or a high-pass filter, or a differentiation circuit, or an integration circuit, or a combination thereof.

Figure 5:
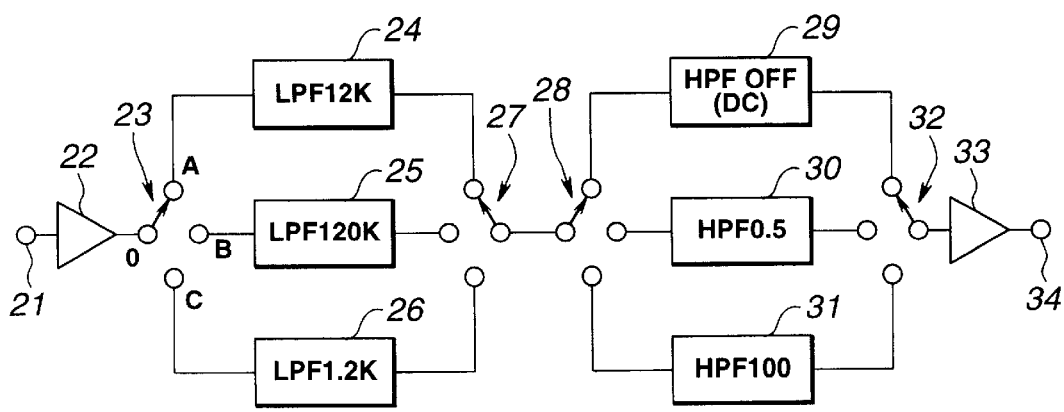
FIG. 5 is a view similar to FIG. 4, showing an example of an integrated filter circuit.

Referring to FIG. 5, a description will be made with regard to an example of the integrated filter circuit constituting the laser Doppler speed measuring apparatus. This integrated filter circuit is constructed so that filter units are connected between input and output terminals 21, 34 in the multistage way. FIG. 5 shows two-stage connection, the filter unit at each stage including three filters disposed in parallel to be switchable through a selector switch.

The input terminal 21 is connected to a fixed contact 0 of a selector switch 23 through an amplifier or buffer 22. The selector switch 23 has a first contact A connected to an input of a low-pas filter 24, and second and third contacts B, C connected to inputs of low-pass filters 25, 26, respectively.

Outputs of the low-pass filters 24–26 are connected to change-over contacts of a selector switch 27, so that switching thereof ensures connection of one of the filters 24–26 to an output side fixed contact of the selector switch 27. An output of the filter unit at the first stage is connected to a fixed contact of an input side selector switch 28 at the second stage so as to be switchably connected to one of high-pass filters 29–31.

Output of the high-pass filters 29–31 are switchably connected to an output side fixed contact through a selector switch 32. An output of the filter unit at the second state is connected to an output terminal 34 through an amplifier or buffer 33. This integrated filter circuit serves to select one of the low-pass filters 24–26 by simultaneous switching of the selector switches 23, 27, and one of the high-pass filters 29–31 by simultaneous switching of the selector switches 28, 32 so as to obtain the filter combination which produces an integrated filter characteristic.

For reference, frequency characteristics of the filter units will be given with regard to a cutoff frequency. As for the low-pass filters 24–26, the filter 24 is 12 KHz, the filter 25 is 120 KHz, and the filter 26 is 1.2 MHz, whereas, as for the high-pass filters 29–31, the filter 29 is null or available to direct current, the filter 30 is 0.5 Hz, and the filter 31 is 100 Hz.

Having described the present invention in connection with the preferred embodiments, it is noted that various changes and modifications can be made without departing from the spirit of the present invention. By way of example, in the second embodiment, in order to enable correction of only frequency characteristics of the low-pass filters of the first integrated filter circuit 3A which have the greatest influence on the measurement results of the laser Doppler speed measuring apparatus, the second integrated filter circuit 3B may include only low-pass filters having substantially the same characteristics as those of the low-pass filters of the first integrated filter circuit 3A.

Moreover, due to lag of a signal, though slight, at the probe, the FM demodulator, and some devices such as a mixer and a band-pass filter, if provided, a delay line having an equivalent lag may be added to obtain more accurate measurement.

What is claimed is:

1. An apparatus for measuring a speed of an object, comprising:
   a source of a laser beam, said laser beam having a reference beam and a beam incident on the object;
   a photodetector arranged to detect a composite light of said reference beam and a beam reflected by the object and generate a signal indicative of said composite light detected;
   an FM demodulator connected to said photodetector, said FM demodulator serving to FM-demodulate said signal;
   filter circuit means for filtering said signal as FM-demodulated; and
   a selector switch interposed between said FM demodulator and said filter circuit means, said selector switch ensuring switching between an output of said FM demodulator and a terminal for directly receiving an external signal.

2. An apparatus as claimed in claim 1, wherein said filter circuit means comprises one of a low-pass filter, a high-pass filter, a differentiation circuit, an integration circuit, and a combination thereof.

3. An apparatus as claimed in claim 1, further comprising:
   another filter circuit means for filtering a signal for exciting the object, said another filter circuit means being provided with independent input and output terminals.

4. An apparatus as claimed in claim 3, wherein said another filter circuit means have substantially the same phase and frequency characteristics as those of said filter circuit means.

5. An apparatus as claimed in claim 4, wherein said another filter circuit means comprise only a low-pass filter having substantially the same phase and frequency characteristics as those of a low-pass filter of said filter circuit means.

6. An apparatus for measuring a speed of an object, comprising:
   means for producing a laser beam, said laser beam having a reference beam and a beam incident on the object;
   means for detecting a composite light of said reference beam and a beam reflected by the object and generating a signal indicative of said composite light detected;
   means, connected to said detecting means, for FM-demodulating said signal;
   means for filtering said signal as FM-demodulated; and
   means, interposed between said FM-demodulating means and said filtering means, for ensuring switching between an output of said FM-demodulating means and a terminal for directly receiving an external signal.

7. An apparatus for measuring a speed of an object, comprising:
   a source of a laser beam, said laser beam having a reference beam and a beam incident on the object;
   a photodetector arranged to detect a composite light of said reference beam and a beam reflected by the object and generate a signal indicative of said composite light detected;
   an FM demodulator connected to said photodetector, said FM demodulator serving to FM-demodulate said signal;
   a filter circuit arranged to filter said signal as FM-demodulated; and
   a selector switch interposed between said FM demodulator and said filter circuit, said selector switch ensuring switching between an output of said FM demodulator and a terminal for directly receiving an external signal.

8. An apparatus for measuring a speed of an object, comprising:
   a source of a laser beam, said laser beam having a reference beam and a beam incident on the object;
   a photodetector arranged to detect a composite light of said reference beam and a beam reflected by the object and generate a signal indicative of said composite light detected;
   an FM demodulator connected to said photodetector, said FM demodulator serving to FM-demodulate said signal;
   a first filter circuit arranged to filter said signal as FM-demodulated; and
   a second filter circuit arranged to filter a signal for exciting the object, said second filter circuit being provided with independent input and output terminals.

9. An apparatus for measuring a speed of an object, comprising:
   means for producing a laser beam, said laser beam having a reference beam and a beam incident on the object;
   means for detecting a composite light of said reference beam and a beam reflected by the object and generating a signal indicative of said composite light detected;
   means, connected to said detecting means, for FM-demodulating said signal;
   first filter means for filtering said signal as FM-demodulated; and
   second filter means for filtering a signal for exciting the object, said second filter means being provided with independent input and output terminals.

* * * * *